(12) United States Patent
Kepplinger et al.

(10) Patent No.: US 6,277,172 B1
(45) Date of Patent: Aug. 21, 2001

(54) METHOD OF CHARGING METAL CARRIERS TO A MELT-DOWN GASIFYING ZONE

(75) Inventors: Leopold Werner Kepplinger, Leonding; Felix Wallner; Johannes-Leopold Schenk, both of Linz, all of (AT)

(73) Assignees: Voest Alpine Industrieanlagenbau GmbH, Linz (AT); Pohang Iron & Steel Co. Ltd., Kyong Bang book-do; Research Institute of Industrial Science & Technology, Phang, both of (KR)

( * ) Notice: Subject to any disclaimer, the term of this patent is extended or adjusted under 35 U.S.C. 154(b) by 0 days.

(21) Appl. No.: 09/205,425

(22) Filed: Dec. 4, 1998

Related U.S. Application Data

(63) Continuation-in-part of application No. PCT/AT97/00118, filed on Jun. 9, 1997.

(30) Foreign Application Priority Data

Jun. 10, 1996 (AT) .................................................... 1007/96

(51) Int. Cl.$^7$ ..................................................... C21B 11/00
(52) U.S. Cl. ................................ 75/500; 75/446; 75/492; 75/501; 75/502
(58) Field of Search ............................. 75/500, 501, 502, 75/492, 446

(56) References Cited

U.S. PATENT DOCUMENTS 4,976,776 * 12/1990 Elvander et al. ....................... 75/502

FOREIGN PATENT DOCUMENTS

| 390622 | 6/1990 | (AT) . |
|---|---|---|
| 0010627 | 5/1980 | (EP) . |
| 0111176 | 6/1984 | (EP) . |
| 0217331 | 4/1987 | (EP) . |
| 0576414 | 12/1993 | (EP) . |
| 0594557 | 4/1994 | (EP) . |
| 921861 | 5/1947 | (FR) . |
| 1209963 | 3/1960 | (FR) . |
| 866646 | 4/1961 | (GB) . |
| 1090826 | 11/1967 | (GB) . |

* cited by examiner

Primary Examiner—Melvyn Andrews
(74) Attorney, Agent, or Firm—Ostrolenk, Faber, Gerb & Soffen, LLP

(57) ABSTRACT

In a method of charging metal carriers which contain a portion of fines and are at least partially reduced and carbon carriers to a melter gasifier (10) in which a melt-down gasifying zone (11) is maintained, the metal carriers and the carbon carriers are fed into the melter gasifier (10) above the level of the melt-down gasifying zone (11) and descend to the melt-down gasifying zone (11) and travel through the same forming a metal melt and producing a reducing gas by coal gasification. In order to prevent a partial discharge of the metal carriers from the melter gasifier (10) during the charging of the same and to be able to achieve uniform distribution of the carbon carriers and the metal carriers, both the carbon carriers and the metal carriers are introduced into the melter gasifier centrally above the melt-down gasifying zone (11), preferably gravitationally, with a central strand (32) of metal carriers being formed which is peripherally surrounded by a jacket strand (37) formed by the carbon carriers.

10 Claims, 2 Drawing Sheets

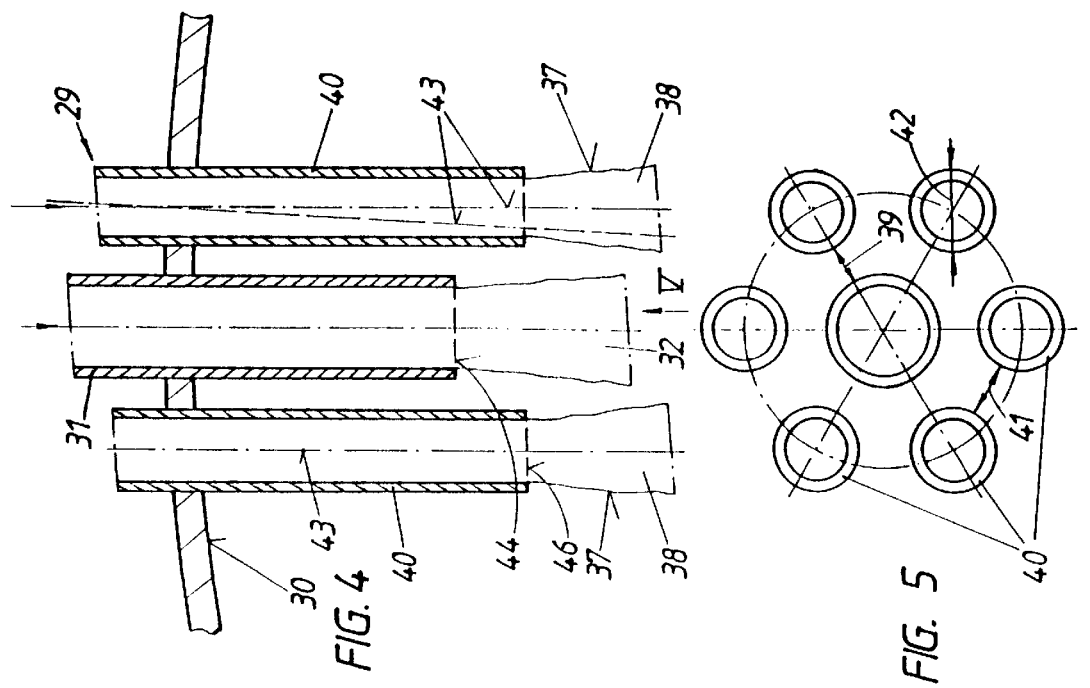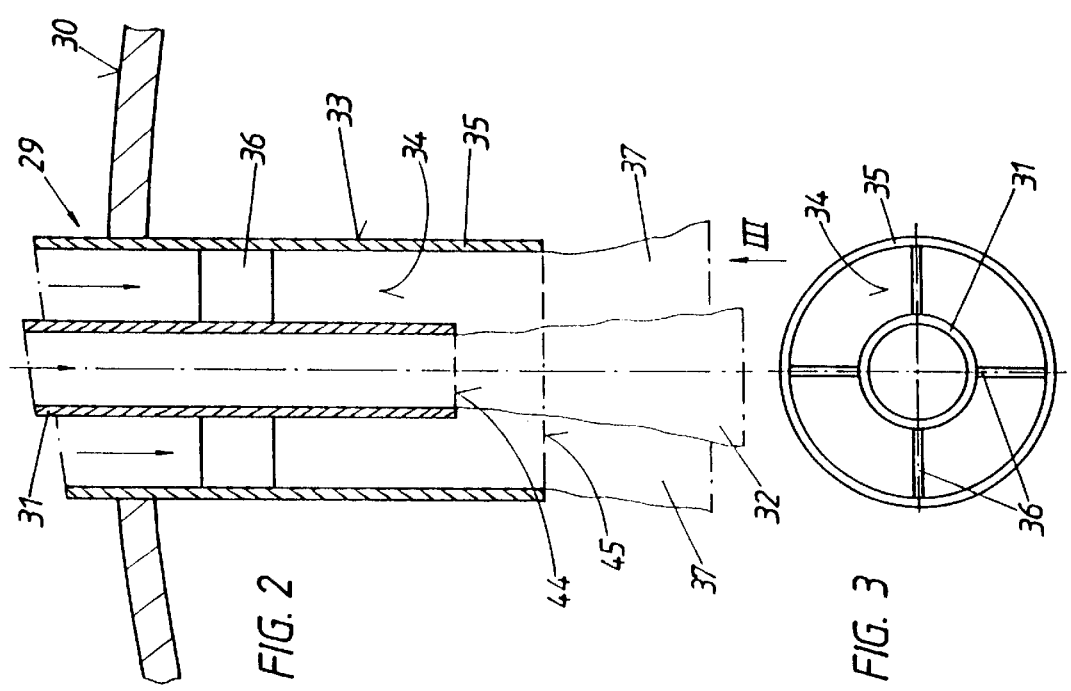

METHOD OF CHARGING METAL CARRIERS TO A MELT-DOWN GASIFYING ZONE

CROSS-REFERENCE TO RELATED APPLICATIONS

Figure 1:
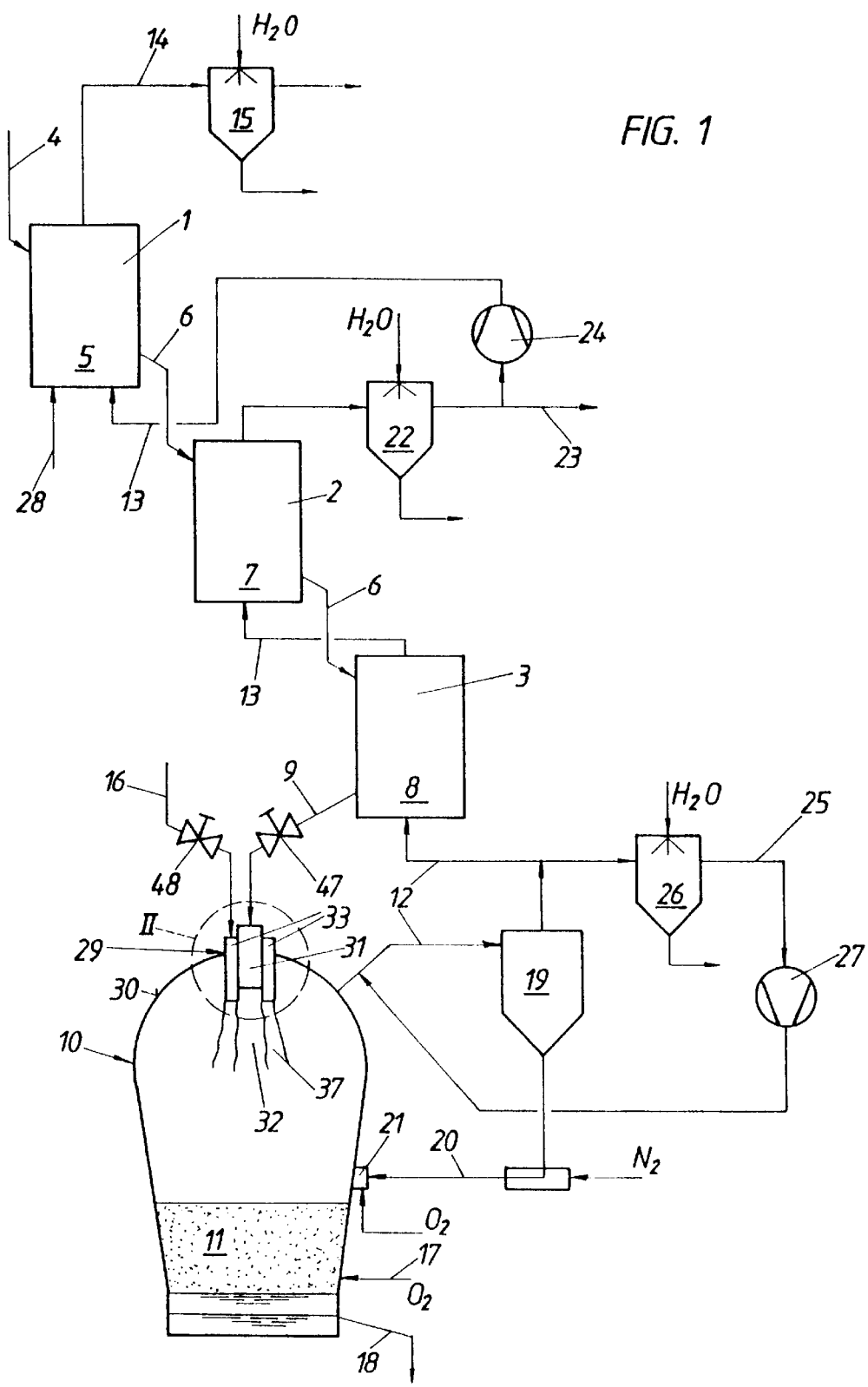

This is a continuation-in-part of International Application PCT/AT97/00118, with an International filing date of Jun. 9, 1997.

The invention relates to a method of charging metal carriers, in particular sponge iron, which contain a portion of fines and are at least partially reduced and carbon carriers to a melter gasifier in which a melt-down gasifying zone is maintained, wherein the metal carriers and the carbon carriers are fed into the melter gasifier above the level of the melt-down gasifying zone and descend to the melt-down gasifying zone and travel through the same forming a metal melt, particularly forming a pig iron melt, and producing a reducing gas by coal gasification under the supply of oxygen in the lower region of the melter gasifier, and a plant for carrying out the method.

From EP-B-0 010 627 it is known to feed in particulate iron-containing material, such as pre-reduced sponge iron, through a centrally arranged charging opening in the hood of the melter gasifier from above, with the particles dropping into the melter gasifier by the effect of gravity and being moderated in the fluidized bed present within the melter gasifier. Coal in lumpy form is charged through a charging opening arranged laterally in the hood of the melter gasifier or in the dome terminating the melter gasifier toward the top, also under the influence of gravity. The reducing gas formed in the melter gasifier is withdrawn through the centrally arranged charging opening for the iron-containing material.

A process of this kind is not suitable for processing fine-particle metal carriers, in particular fine-particle sponge iron, since the fine-particle metal carriers due to the pronounced gas flow of the reducing gas formed in the melt-down gasifying zone and withdrawn through the central charging opening arranged in the hood or in the dome of the melter gasifier would be instantly carried out of the melter gasifier. Such a discharge of the fine-particle metal carriers is further favored by the temperature reigning in the upper region of the melter gasifier, i.e. in the region above the melt-down gasifying zone, which is too low to ensure a melt-down, i.e. agglomeration of the fine particles at the charging site to form bigger particles which in spite of the ascending gas stream could sink down into the melt-down gasifying zone.

From EP-A-0 217 331 it is known to introduce pre-reduced fine ore into a melter gasifier and to completely reduce and melt it by means of a plasma burner while supplying a carbon-containing reducing agent. The pre-reduced fine ore or the sponge-iron powder respectively is fed to a plasma burner provided in the lower section of the melter gasifier. A disadvantage of this method is that by supplying the pre-reduced fine ore directly in the lower meltdown region, i.e. in the region where the melt collects, complete reduction can no longer be ensured and the chemical composition necessary for further processing the pig iron cannot be achieved by any means. Moreover, the charging of major amounts of pre-reduced fine ore is not feasible due to fluidized bed or the fixed bed forming from coal in the lower region of the melter gasifier, as it is not possible to carry off a sufficient quantity of the melting products from the high-temperature zone of the plasma burner. The charging of major amounts of pre-reduced fine ore would lead to instant thermal and mechanical failure of the plasma burner.

From EP-B-0 111 176 it is known to feed a fine grain fraction of sponge iron particles into the melter gasifier through a downpipe projecting from the head of the melter gasifier into the proximity of the coal fluidized bed. At the end of the downpipe a baffle plate is provided for minimizing the velocity of the fine grain fraction, resulting in a very low exit velocity of the fine grain fraction from the downpipe. At the charging site, the temperature reigning in the melter gasifier is very low, whereby immediate melting of the supplied fine grain fraction is prevented. This and the low exit velocity from the downpipe cause a substantial portion of the supplied fine grain fraction to be carried out of the melter gasifier again together with the reducing gas generated in the same. The charging of a major amount of sponge iron particles containing a fine portion or of only a fine grain fraction is not feasible in accordance with this method.

From EP-A-0 594 557 it is known to charge a sponge iron fine grain fraction by means of a conveying gas directly into the fluidized bed formed by the melt-down gasifying zone in the melter gasifier. However, this is disadvantageous; clogging of the fluidized bed may ensue, leading to insufficient gas circulation and optionally to damming-up of gas and subsequently to eruptive outbreaks of gas, by which the clogged fluidized bed is broken up. Hereby, the gasification process for the carbon carriers and also the melt-down process for the reduced iron ore are markedly disturbed.

From EP-A-0 576 414 it is known to feed fine-particle metal carriers into the melt-down gasifying zone via dust burners. One disadvantage associated with this process is that in the melt-down gasifying zone there may result regions with an excess of metal and regions with an excess of carbon.

According to AT-B-390.622, blowing of a fine grain fraction is effected into the fixed bed of a melter gasifier, wherein the fixed bed acts like a filter. Hereby gas permeability is reduced and as a consequence thereof outbreaks of gas may occur.

From GB-A-1 090 826 a method is known in which iron ore is melted in an oxygen-fuel flame which is directed onto a melting-bed present in a melting chamber from above and the ore melt is subsequently passed into a reduction chamber and is reduced there.

The invention aims at avoiding the above-mentioned disadvantages and difficulties and has as its object to provide a method of the initially described kind and a plant for carrying out the method, with said method and plant allowing processing of fine-particulate metal carriers without the need of briquetting and wherein, on the one hand, discharge of the supplied fine particles, possibly in the pre-reduced or in the completely reduced state, by the reducing gas generated in the melter gasifier is reliably avoided and on the other hand, if necessary, a final reduction of the fine particles is ensured. A further object to be achieved in accordance with the invention is to achieve a distribution as uniform as possible of the metal carriers and the carbon carriers in the fluidized bed of the melt-down gasifying zone.

In accordance with the invention, this object is achieved in that both the carbon carriers and the metal carriers are introduced into the melter gasifier centrally above the melt-down gasifying zone, preferably gravitationally, with a central strand of metal carriers being formed which is peripherally surrounded by a jacket strand formed by the carbon carriers.

By a dense formation of a jacket, formed of carbon carriers, around the central strand of metal carriers, dust loss of the fine portion of the metal carriers, i.e. discharge of said fine portion along with the reducing gas generated in the melter gasifier, is prevented.

In accordance with a preferred embodiment, the jacket strand formed by the carbon carriers is formed by several closely adjacent strands of carbon carriers. Herein it is feasible by a suitable arrangement of the strands formed of carbon carriers to influence the structure of the fluidized bed in the melter gasifier, i.e. it is feasible to selectively charge a larger amount of carbon carriers to the central region or into the peripheral region of the fluidized bed.

Preferably, the amounts of carbon carriers and/or metal carriers charged over a unit of time are varied, wherein advantageously the variations in the amounts of metal carriers and carbon carriers charged per unit of time are effected such that the amount of metal carriers charged is reduced and at the same time the amount of carbon carriers charged remains roughly the same or is increased, or conversely, the amount of carbon carriers charged is reduced and at the same time the amount of metal carriers charged remains roughly the same or is increased, or the amount of metal carriers charged remains roughly the same and the amount of carbon carriers is increased, or conversely, the amount of carbon carriers remains roughly the same and the amount of metal carriers is increased.

Hereby, it is also feasible to influence the structure of the gasifying zone layer by layer.

A plant for carrying out the method, with a melter gasifier having feed ducts for oxygen-containing gases and carbon carriers and at least partially reduced metal carriers and from which a gas discharge duct for a reducing gas departs from the area of a dome terminating the melter gasifier toward the top, and which is also provided with a tap for a metal melt, in particular for pig iron and slag, with the feed duct for oxygen-containing gases being arranged in the lower region of the melter gasifier, is characterized in that centrally inside the dome of the melter gasifier a charging unit both for carbon carriers and for metal carriers is provided having a central pipe for feeding the metal carriers as well as a feed duct for carbon carriers which forms a jacket strand around the central pipe.

Preferably, the feed duct for carbon carriers is formed by a jacket pipe that peripherally surrounds the central pipe while leaving an annular gap.

A preferred embodiment is characterized in that the feed duct for carbon carriers is formed by several feeding pipes that are arranged peripherally around the central pipe, at a close distance from the same, wherein advantageously the free distance between the feeding pipes and the free distance from the feeding pipes to the central pipe are smaller than the diameter of a feeding pipe, preferably less than half the diameter of a feeding pipe.

To achieve a particularly dense jacket which very closely surrounds the central strand formed of metal carriers, the feeding pipes for the carbon carriers advantageously converge toward one another and also toward the central pipe in the direction in which the carbon carriers flow through.

Suitably, the outlet opening of the central pipe is arranged at a higher level than the outlet opening(s) of the feed duct for carbon carriers.

A further preferred embodiment is characterized in that both the feed duct (33) for carbon carriers and the central pipe are formed by pipes that are provided with an inner cooling.

In the following, the invention is described in a more detailed manner with reference to several exemplary embodiments illustrated in the drawing, wherein FIG. 1 shows an entire plant for producing liquid pig iron or liquid steel pre-products from iron ore in schematic representation. FIGS. 2 and 3 show a detail of the melter gasifier in vertical section and viewed in the direction of the arrow III of FIG. 2; FIGS. 4 and 5 show a further embodiment of the invention, depicting views that are analogous to FIGS. 2 and 3.

The plant in accordance with the invention is provided with three fluidized-bed reactors 1 to 3 subsequently connected in series, wherein iron oxide containing material, such as fine ore, via an ore feed duct 4 is supplied to the first fluidized-bed reactor 1, in which in a preheating stage 5 preheating of the fine ore and possibly pre-reduction takes place, and subsequently is conducted from fluidized-bed reactor 1 to fluidized-bed reactor 2, 3 via conveying ducts 6. Inside the fluidized-bed reactor 2, pre-reduction is effected in a pre-reduction stage 7 and inside the fluidized-bed reactor 3 in a final reduction stage 8 final or complete reduction respectively, of the fine ore to sponge iron.

The completely reduced material, hence the sponge iron, via a conveying duct 9 is fed into a melter gasifier 10, namely in a specific manner to be described lateron. Inside the melter gasifier 10 in a melt-down gasifying zone 11 formed by a fixed bed and/or fluidized bed, a CO- and $H_2$—containing reducing gas is generated from coal and oxygen-containing gas and via the reducing-gas feed duct 12 is fed into the fluidized-bed reactor 3 arranged last with respect to the direction of flow of the fine ore. Preferably, the melt-down gasifying zone 11 is formed by a fixed bed extending over the major part of the melt-down gasifying zone 11 and covered by a fluidized bed of low height. The reducing gas is then in counterflow to the ore flow conducted from fluidized-bed reactor 3 to fluidized-bed reactor 2 to 1, namely via the connecting ducts 13, is conducted out of the fluidized-bed reactor 1 as a top gas via the top-gas discharge duct 14 and subsequently is cooled and scrubbed in a wet scrubber 15.

The melter gasifier 10 is provided with a feed duct 16 for solid carbon carriers, a feed duct 17 for oxygen-containing gases as well as optionally feed ducts for carbon carriers, such as hydrocarbons, that are liquid or gaseous at room temperature and for calcined fluxes. Inside the melter gasifier 10, below the melt-down gasifying zone 11, molten pig iron or molten steel pre-material respectively and molten slag collect, which are tapped off through a tap 18.

In the reducing-gas feed duct 12 departing from the melter gasifier 10 and running into the fluidized-bed reactor 3, a dedustifying means 19, such as a hot gas cyclone, is provided, the dust particles separated in the cyclone being fed to the melter gasifier 10 via the return duct 20, with nitrogen as the conveying means and passing via a burner 21 under the blowing of oxygen.

The fluidized-bed reactor 2, in which the pre-reduction of the fine ore takes place, is supplied with a much smaller amount of reducing gas, which, moreover, has a lower reduction potential, which is, however, quite sufficient for the purpose of pre-reduction. As the degree of reduction of the material to be reduced which is reached here is lower than that in the final reduction stage 8, no "sticking" occurs at this point. The reacted reducing gas exiting the fluidized-bed reactor 2 is supplied to a scrubber 22 via the duct 13. A portion of the scrubbed reacted reducing gas is withdrawn through an export-gas discharge duct 23; another portion is supplied to the preheating stage 5, i.e. the fluidized-bed reactor 1, via the duct 13 via a compressor 24.

A possibility for adjusting the reducing-gas temperature results due to the gas recirculating duct 25, which is preferably provided and which departs from the reducing-gas feed duct 12 and feeds back a portion of the reducing gas via a scrubber 26 and a compressor 27 into said reducing-gas feed duct 12, namely at a position preceding the hot gas cyclone 19.

In order to adjust the preheating temperature of the fine ore it is feasible to supply to the preheating stage 5, hence to the fluidized-bed reactor 1, an oxygen-containing gas, such as air or oxygen, through a duct 28, whereby a partial combustion of the reacted reducing gas supplied to the preheating stage 5 takes place.

In accordance with the invention, charging of the sponge iron and the carbon carriers takes place via a separate charging unit 29, which is illustrated in greater detail in two variants in FIGS. 2 to 5.

The charging unit 29 is provided with a central pipe 31 for feeding the sponge iron, which under the effect of gravity drops into the melter gasifier 10, forming a strand 32, said central pipe being centrically arranged in the dome 30 of the melter gasifier 10 that terminates the melter gasifier 10 toward the top. In accordance with the embodiment illustrated in FIG. 2, the central pipe 31 is surrounded by a feed duct 33 for carbon carriers, which is formed by a jacket pipe 35 surrounding the central pipe 31 but leaving an annular gap 34. Via radial braces 36, the central pipe 31 is supported on the jacket pipe 35 affixed to the dome 30. Via the annular gap 31, feeding of the carbon carriers is effected, which then form a jacket strand 37 that surrounds the central strand 32 of the sponge iron in a closed manner.

The jacket strand 37, formed by the carbon carriers, constitutes a protection for the central strand 32 formed of sponge iron, which is enveloped by it, so that dust loss of sponge iron is avoided. The carbon carriers and the sponge iron descend as far as to the melt-down gasifying zone 11 and travel through the same, during which melting—optionally after a final reduction—of the sponge iron as well as gasification of the carbon carriers takes place.

In accordance with the embodiment represented in FIGS. 4 and 5, the jacket strand 37 is formed by several closely adjacent strands 38 of carbon carriers. According to this embodiment, the feed duct 33 for carbon carriers is formed by several feeding pipes 40, which surround the central pipe 31 at a close distance 39. The distance 39, 41 of the feeding pipes 40 from each other and from the central pipe 31 is slightly less than the measure of a diameter 42 of a feeding pipe 40; preferably the distance 39, 41 is less than half the diameter 42 of a feeding pipe 40.

If in accordance with this embodiment a particularly dense jacket strand 37 of carbon carriers is to be formed around the central strand 32 of sponge iron, then suitably the axes 43 of the feeding pipes 40 are directed so as to be inclined towards the central pipe 31, i.e. the feeding pipes 40 converge toward one another in the direction of flow of the carbon carriers and also toward the central pipe 31, as is for instance illustrated in broken lines in FIG. 4 for one of the feeding pipes 40.

The outlet opening 44 of the central pipe 31 is located at a higher level than the outlet opening 45 of the jacket pipe 35 in accordance with FIG. 2 and also higher than the outlet openings 46 of the feeding pipes 40 in accordance with FIG. 4. All of the pipes 31, 35, 40 are preferably provided with an inner liquid cooling, but this is not illustrated in detail.

Both the conveying duct 9 for the sponge iron and the feed duct 16 for solid carbon carriers are equipped with quantity adjustment means 47, 48, so that it is feasible to adjust the amount charged per unit of time. Hereby it is possible to achieve a layered structure or else an even distribution of the carbon carriers and of the sponge iron in the fixed bed of the melt-down gasifying zone 11.

The invention is not limited to the exemplary embodiments represented in the drawings but can be modified in various respects. For instance it is feasible to surround the central pipe 31 with a jacket pipe 35, in a manner similar to that illustrated in FIG. 2, but with the carbon carriers exiting therefrom under the formation of several strands of carbon, through bottom openings of a bottom arranged on the face of the jacket pipe 35. Further, the invention can be realized regardless of the manner of the pre- and/or final reduction.

What is claimed is:

1. A method of charging metal carriers which contain a portion of fines and are at least partially reduced and carbon carriers to a melter gasifier (10) in which a melt-down gasifying zone (11) is maintained, wherein the metal carriers and the carbon carriers are fed into the melter gasifier (10) above the level of the melt-down gasifying zone (11) and descend to the melt-down gasifying zone (11) and travel through the same forming a metal melt, and producing a reducing gas containing CO and $H_2$ by coal gasification under the supply of oxygen in the lower region of the melter gasifier (10), characterized in that both the carbon carriers and the metal carriers are introduced into the melter gasifier centrally above the melt-down gasifying zone (11) with a central strand (32) of metal carriers being formed which is peripherally surrounded by a jacket strand (37) formed by the carbon carriers.

2. A method according to claim 1, characterized in that the jacket strand (37) formed by the carbon carriers is formed by several closely adjacent strands (38) of carbon carriers.

3. A method according to claim 1, characterized in that the amounts of carbon carriers and/or metal carriers charged over a unit of time are varied.

4. A method according to claim 3, characterized in that the variations in the amounts of metal carriers and carbon carriers charged per unit of time are effected such that the amount of metal carriers charged is reduced and at the same time the amount of carbon carriers charged remains roughly the same or is increased.

5. A method according to claim 3, characterized in that the variations in the amounts of metal carriers and carbon carriers per unit of time are effected such that the amount of metal carriers charged is reduced and at the same time the amount of carbon carriers charged is reduced and at the same time the amount of metal carriers charged remains roughly the same or is increased.

6. A method according to claim 3, characterized in that the variations in the amounts of metal carriers charged is reduced and at the same time the amount of metal carriers charged remains roughly the same and the amount of carbon carriers is increased.

7. A method according to claim 3, characterized in that the variations in the amounts of metal carriers and carbon carriers charged per unit of time are effected such that the amount of metal carriers charged is reduced and at the same time the amount of carbon carriers remains roughly the same and the amount of metal carriers is increased.

8. A method according to claim 1, wherein the metal carrier is sponge iron.

9. A method according to claim 1, wherein the carbon carrier and the metal carrier are introduced into the melter gasifier gravitationally.

10. A method according to claim 1 wherein said metal melt is a pig iron melt.

* * * * *